United States Patent
Katrak et al.

(10) Patent No.: US 8,521,380 B2
(45) Date of Patent: Aug. 27, 2013

(54) SHIFT RAIL TRANSMISSION POSITION SENSING WITH TOLERANCE FOR SENSOR LOSS

(75) Inventors: Kerfegar Khurshed Katrak, Kalamazoo, MI (US); Naresh Kumar Kodela, Pune (IN); Richard Earl Zuppann, Kalamazoo, MI (US); Christopher Pollack, Kalamazoo, MI (US); John Manyala, Kalamazoo, MI (US); Todd William Fritz, Kalamazoo, MI (US); Ken R. Anderson, Kalamazoo, MI (US); Ian Daniel McKenzie, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 432 days.

(21) Appl. No.: 12/849,457

(22) Filed: Aug. 3, 2010

(65) Prior Publication Data

US 2011/0035123 A1  Feb. 10, 2011

Related U.S. Application Data

(60) Provisional application No. 61/231,134, filed on Aug. 4, 2009.

(51) Int. Cl.
*G06F 17/00* (2006.01)
*F16H 63/00* (2006.01)

(52) U.S. Cl.
USPC ............................ 701/55; 701/51; 74/335

(58) Field of Classification Search
None
See application file for complete search history.

(56) References Cited

U.S. PATENT DOCUMENTS

| | | | |
|---|---|---|---|
| 5,325,083 A | 6/1994 | Nassar et al. | |
| 5,370,015 A | 12/1994 | Moscatelli | |
| 5,371,487 A | 12/1994 | Hoffman et al. | |
| 5,406,860 A | 4/1995 | Easton et al. | |
| 5,519,393 A | 5/1996 | Brandestini | |
| 5,561,416 A * | 10/1996 | Marshall et al. | 340/456 |
| 5,601,513 A | 2/1997 | Arai et al. | |
| 5,714,852 A | 2/1998 | Enderich | |
| 5,736,701 A | 4/1998 | O'Brien et al. | |
| 5,754,963 A | 5/1998 | Nunneley et al. | |
| 5,847,344 A | 12/1998 | Denyer et al. | |
| 6,018,294 A | 1/2000 | Vogel et al. | |
| 6,072,390 A | 6/2000 | Dourra et al. | |
| 6,223,113 B1 | 4/2001 | McCunn et al. | |
| 6,253,136 B1 | 6/2001 | Stratton et al. | |
| 6,324,040 B1 | 11/2001 | Saladin et al. | |
| 6,376,929 B1 | 4/2002 | Nakajima | |

(Continued)

*Primary Examiner* — Khoi Tran
*Assistant Examiner* — Robert Nguyen
(74) *Attorney, Agent, or Firm* — Rader, Fishman & Grauer PLLC

(57) ABSTRACT

A number N of position sensors, each associated with one of N shift rails in a shift rail transmission system, wherein the set of N sensors is divided into subsets and each subset is provided a common reference from a control module; and a processing component that determines from data from each sensor whether the shift rail associated with that sensor is in a position of engagement of a first gear, a position of engagement of a second gear, or in a neutral position.

Further, providing a first common reference to a first set of shift rail position sensors; providing a second common reference to a second set of shift rail position sensors; receiving sensor data from each position sensor; determining that the data from the first set of position sensors is unreliable; and operating a transmission using only the gears related to the position sensors in the second set.

19 Claims, 10 Drawing Sheets

(56) References Cited

U.S. PATENT DOCUMENTS

| | | |
|---|---|---|
| 6,405,611 B1 | 6/2002 | DeJonge et al. |
| 6,411,879 B2 | 6/2002 | Kupper et al. |
| 6,492,900 B2 | 12/2002 | Rankin |
| 6,546,780 B1 | 4/2003 | Palfenier et al. |
| 6,866,611 B2 | 3/2005 | Tsuzuki et al. |
| 6,904,823 B2 | 6/2005 | Levin et al. |
| 7,042,363 B2 | 5/2006 | Katrak et al. |
| 7,142,132 B2 | 11/2006 | Katrak et al. |
| 7,280,333 B2 | 10/2007 | Horsky et al. |
| 7,383,120 B2 | 6/2008 | Stockbridge et al. |
| 2006/0082386 A1 | 4/2006 | Katrak et al. |
| 2006/0100758 A1 | 5/2006 | Katrak et al. |
| 2006/0149496 A1 | 7/2006 | Takeuchi |
| 2006/0179962 A1 | 8/2006 | Katrak et al. |
| 2006/0190142 A1 | 8/2006 | Katrak et al. |
| 2010/0099537 A1* | 4/2010 | Maten et al. .................. 477/130 |

* cited by examiner

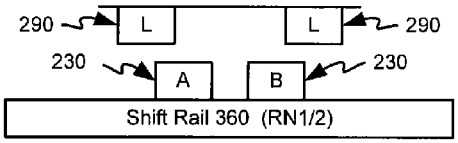
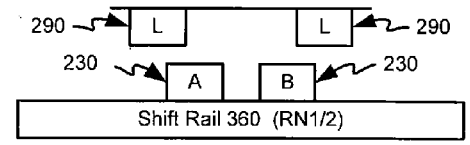
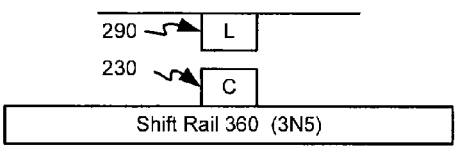
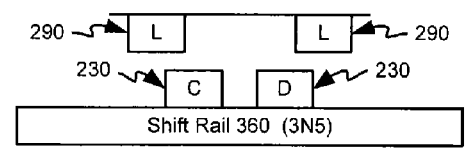
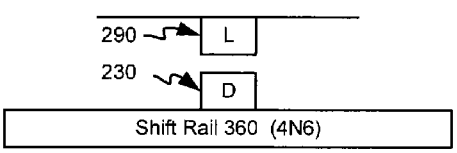
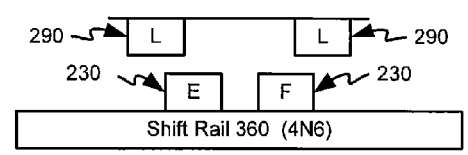
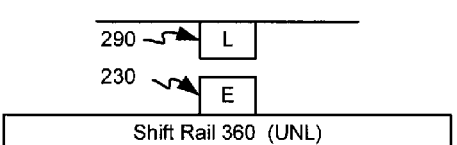
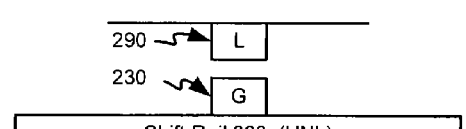
Fig. 8A
Fig. 8B

SHIFT RAIL TRANSMISSION POSITION SENSING WITH TOLERANCE FOR SENSOR LOSS

CROSS REFERENCE TO RELATED APPLICATIONS

This application claims priority to U.S. Provisional Patent Application 61/231,134, filed Aug. 4, 2009, which is hereby incorporated by reference in its entirety. The following cases, entitled SHIFT RAIL TRANSMISSION POSITION SENSING WITH A MINIMUM NUMBER OF SENSORS, SHIFT RAIL TRANSMISSION POSITION SENSING WITH TOLERANCE FOR SENSOR LOSS, and SHIFT RAIL TRANSMISSION POSITION SENSING, of which the present case is one, have all been filed on the same date. The contents of the two applications that have a different title then the present application are hereby incorporated herein in their entirety.

BACKGROUND

In a transmission, it is desirable to have an indication of whether gears are fully engaged or disengaged. This information may be useful in either an open-loop or a closed-loop control system. In an open-loop transmission system, current gear position may be determined prior to commencing gear engagement. For example, in a shift rail transmission, the current position of each shift rail may be used to verify the appropriateness of translating one of the shift rails to a new position. Further, in an open loop shift rail transmission system, the duration of shift rail translation or travel from one position to another in response to a movement command of a specified duration may be used to update the command duration for subsequent shift rail movement. In a closed loop transmission system, gear or shift rail position may be used as feedback in the closed loop control so that, instead of asserting a movement command for a specified duration, the shift rail translates or travels until it reaches the desired position as indicated by the position sensor feedback.

A control system may include a system controller, further including a processor generating control signals and monitoring feedback signals. Multiple sensors may be employed to provide accurate position information, and the information from each sensor may be further used to cross-check the information from other sensors.

Accurate position information generally requires the use of several position sensors. However, in a system where cost, space, weight and the like may be constraining factors having too many sensors can be an issue. Therefore, it is desirable to minimize the number of sensors and the number of wires that must be run to the sensors potentially while still promoting redundancy in case one or more sensors fails.

BRIEF DESCRIPTION OF THE DRAWINGS

FIGS. 8A and 8B illustrate an exemplary four-rail transmission system with one or more position sensors per rail.

DETAILED DESCRIPTION

Figure 1:
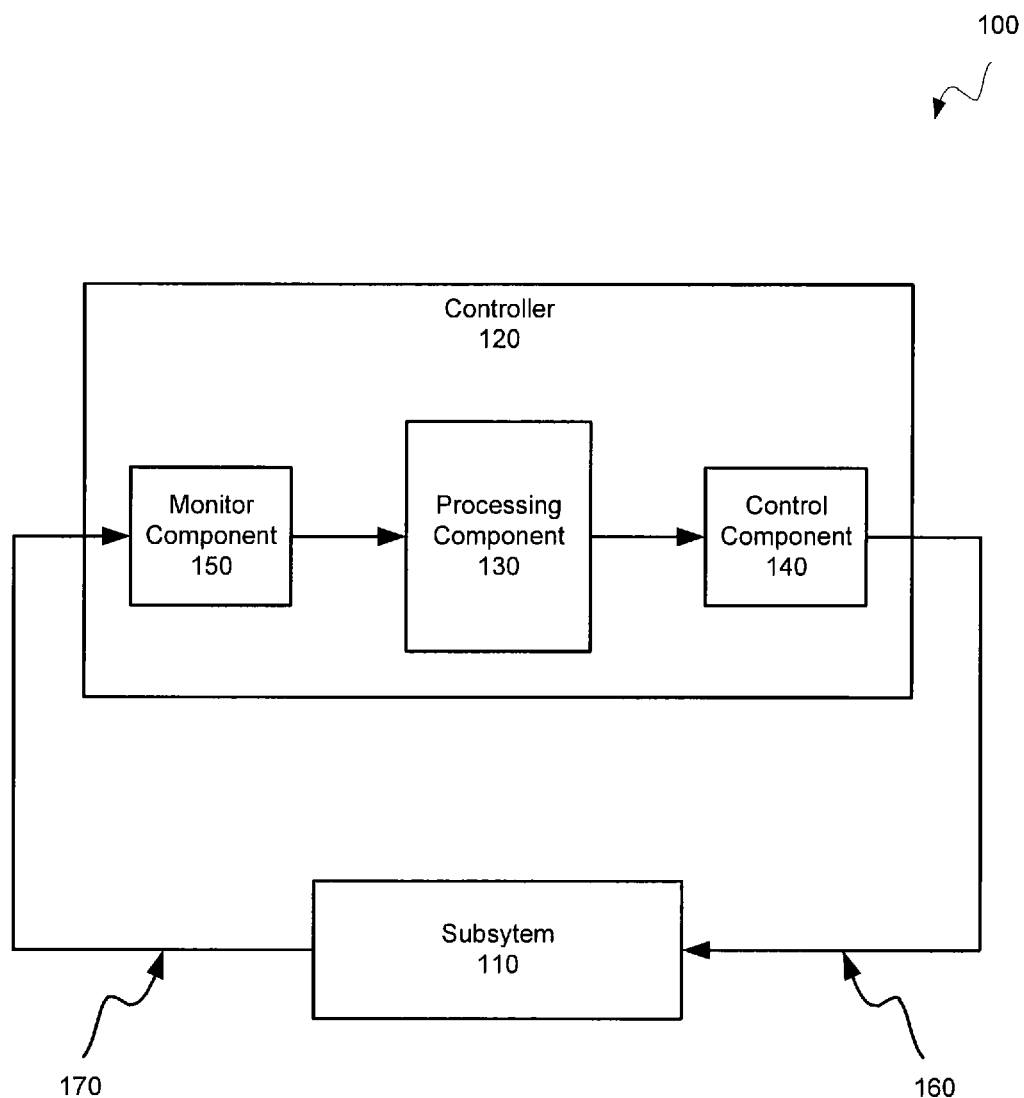
FIG. 1 illustrates an exemplary system for system control.

In an exemplary control system, a processor may generate signals to control a movable element. The processor may also receive feedback from one or more position sensors to identify position of the movable element or to verify that the movable element is approaching or has reached an intended position. For example, the processor may compare position data from a sensor to an expected position, e.g., compare an expected time to an actual time between peaks of a received sensor signal; compare an expected value to a peak value of a received sensor signal; compare an expected value to the slope of a received sensor signal, etc. to identify position. In an open-loop control system, such comparisons may be used to adjust variables for the determination of a control command, e.g., if a longer-than expected time was required to reach a position, a software counter may be adjusted to increase the length of time that current is supplied to a solenoid, wherein the new counter value would be used the next time the solenoid is activated. In a closed-loop control system, comparisons of received signals to expected values may result in an error measurement between the sensed and expected positions, such that the processor generates further signals to further control the movable element to reduce the error in near real time. Such closed-loop control may be performed periodically or substantially continuously.

Comparison of a received signal value to an expected value may additionally provide diagnostic information for a sensor. For example, if the difference between a measured magnitude of the received signal versus an expected magnitude exceeds a predefined threshold, the processor may determine that the sensor signal is not valid, and may perform diagnostics to identify a failure mode of the sensor or its connections. Further, if it is determined that a sensor signal is not valid, the system may perform special steps to mitigate the impact of the loss of the sensor signal.

Selection and placement of the position sensors may result in a combination of sensor signals that contain not only position information for each sensor individually, but also position and diagnostic information determined from the combination of signals. For example, multiple sensors may be selected and placed so that the signals from the individual sensors are used to cross-check each other. The sensors may be similarly placed or may be offset, inverted or otherwise distinguishable from each other to provide better capability for cross-checking between the signals. Examples of cross-checking signals include determining a correlation between two or more signals and comparing to an expected threshold value; determining an average value for all of the signals and comparing to an expected envelope of values; and determining whether all of the signals indicate the same position. In the discussion that follows below the comparison takes place within a controller using a time domain although the same comparison may be done by the controller using a frequency domain. Moreover, under some approaches correlation may take place using distance rather than time or frequency. Alternative implementations are possible for checking and cross-checking signal information and what is described is only exemplary.

Using information from multiple sensors to allow for cross-checking between the sensors may allow for a reduction in the number of sensors, and a corresponding number of wires or other support elements (e.g., sensor fasteners) required in a system.

A control system may use multiple processors that read sensor signals and compare the values read between the processors to provide an additional layer of cross-checking.

FIG. 1 illustrates an exemplary control system 100 with feedback, including a subsystem 110 and a system controller 120, with interfaces 160 and 170. The subsystem 110 is a subsystem for which feedback is necessary or desired for predictable function. An exemplary implementation of system 100 is shift-rail transmission control, discussed below with respect to FIGS. 3, 7D, 8A, and 8B.

System controller 120 includes a processing component 130, a control component 140 and a monitor component 150. System controller 120 may be implemented as hardware, firmware and/or software, and further may be implemented as any one or more computing systems and/or devices. For example, when system controller 120 is implemented as multiple computing devices, control component 140 and monitor component 150 may be co-located with the subsystem 110, whereas processing component 130 may be located remotely, e.g., as a separate hardware device, or a firmware or software component in a computing device. Co-location may include mounting of components directly on, adjacent to, within, etc., an element of subsystem 110. Remote in this context may include mounting of components in separate electronic modules, or separate physical locations, e.g. at a separate workstation or in a separate building. In one exemplary illustration, the entire system controller 120 may be integrated within the subsystem 110, e.g., as components on a circuit board mounted directly on or within a piece of equipment, such as electronics within a submersible pump.

As noted, processing component 130 may be implemented as one or more computing systems and/or devices. In general, computing systems/devices may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device. Further, a computing device may be an embedded processor within an electronic module, and may further be an embedded processor within an integrated circuit.

Computing devices generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Controller 120 may control and monitor more than one subsystem 110. In one exemplary implementation controller 120 monitors and controls multiple vehicle subsystems. Not only may the controller 120 monitor and control the individual subsystems 110 such as vehicle subsystems, controller 120 may also monitor and control the larger system, such as a vehicle powertrain including transmission and engine components. To further explain, controller 120 may monitor and control multiple subsystems 110 while also monitoring and controlling system 100 at a higher level. Monitor and control at a higher level may provide more capability for identifying improper subsystem 110 behavior by observing the interaction between subsystems.

Control component 140 generally includes the appropriate interface for sending control signals to a particular subsystem 110. In one exemplary implementation, control component 140 is a circuit that converts electrical signals generated at the processing component 130 to electrical signals appropriate to activate a device in the subsystem 110. For example, control component 140 may include circuitry to convert one or more low-voltage digital signals to three high-voltage signals for driving a tri-phase motor, or a transceiver that converts digital signals from the processing component 130 to a serial data stream for control of a device using a serial protocol. In an exemplary system 100 in which control component 140 is co-located with subsystem 110, control component 140 may be, e.g., an electronic circuit attached to an actuator on a valve. In another implementation in which control component 140 is co-located with subsystem 110, control component 140 may receive information from remotely located processing component 130 in the form of a serial protocol, and convert the information to electrical signals, e.g., an analog voltage to apply to an electromechanical device driving a hydraulic piston. Control component 140 is adapted for the specific set of devices of subsystem 110 that are under the control of controller 120.

Monitor component 150 generally includes an appropriate interface for receiving input from the subsystem 110. In one exemplary implementation, monitor component 150 is a circuit that converts electrical signals received from subsystem 110 into electrical signals appropriate for processing component 130. For example, monitor component 150 may include circuitry to convert differential analog inputs into low voltage digital signals, or a transceiver to convert a two-wire serial protocol signal to a low voltage single line serial data stream. In an exemplary system 100 in which monitor component 150 is co-located with subsystem 110, monitor component 150 may be, for example, an electronic circuit attached to a sensor. In another illustrative implementation in which monitor component 150 is co-located with subsystem 110, monitor component 150 may receive information from subsystem 110 as, for instance, a tri-state digital signal, and transmit the information to remote processing component 130 using a serial protocol. Monitor component 150 is adapted for the specific set of information sources monitored by controller 120.

Interfaces 160 and 170 include one or more wired or wireless mechanisms for transmitting signals between system controller 120 and subsystem 110. For example, if communication between control component 140 and subsystem 110 is via a serial protocol, then interface 160 may include a cable meeting the specifications for the implemented serial protocol. As another example, if information from subsystem 110 is sent to monitor component 150 as analog signals then interface 170 may be wire of a gauge appropriate for the power requirements of the analog signal transmission.

Figure 2:
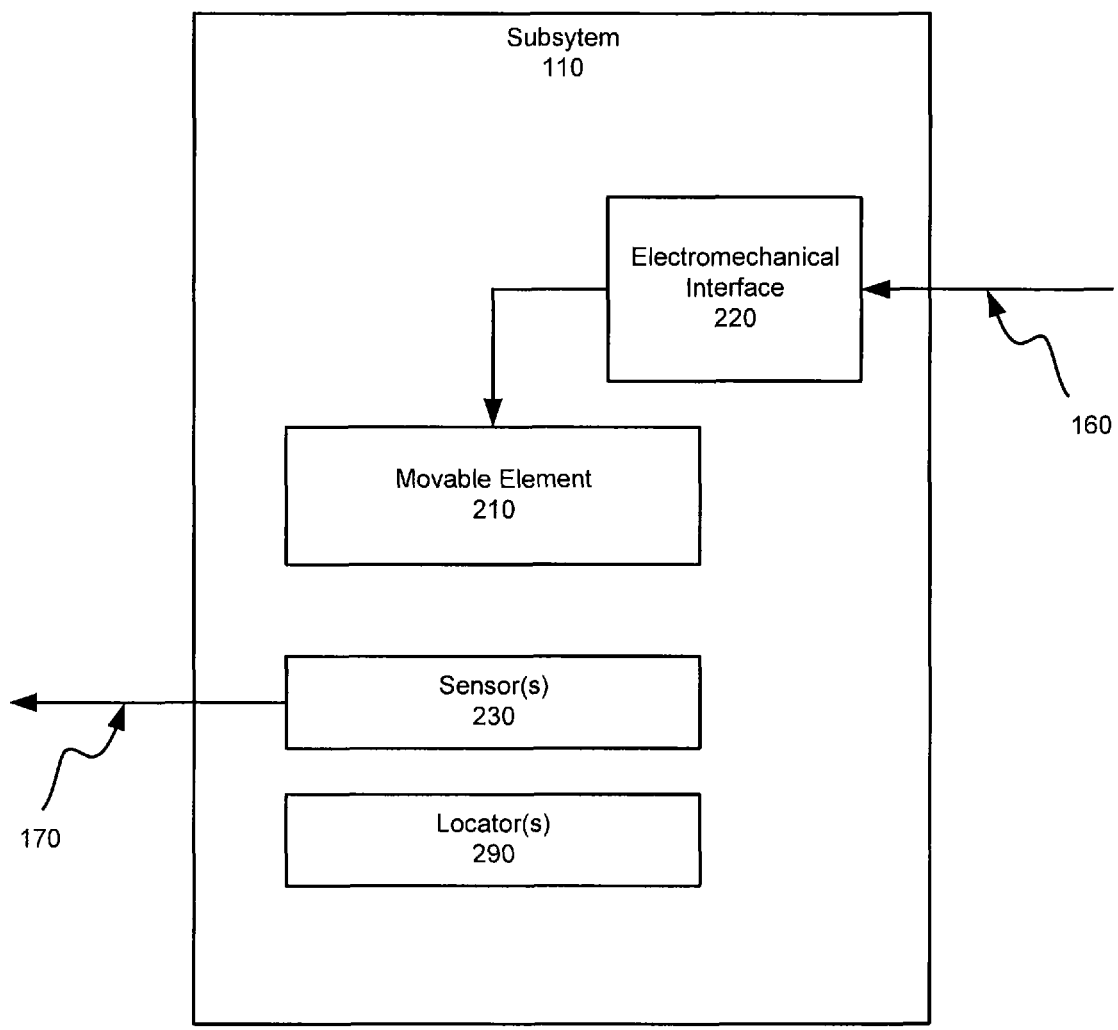
FIG. 2 illustrates an exemplary system for a subsystem under control.

FIG. 2 illustrates an exemplary implementation of a subsystem 110 directed to the control and monitoring of a movable element 210. Subsystem 110 in this implementation includes an electromechanical interface 220 and at least one sensor 230. An example of a transmission subsystem wherein the movable element 210 is a shift rail is described below with respect to FIG. 3.

Movable element 210 generally includes any device that based upon control signals or instructions changes location with one or more degrees of freedom. Movable element 210 may move constantly or infrequently, may move along one axis or have several degrees of rotational and linear freedom, may always return to its original location or may never return to its original location, etc. Movable element 210 may be propelled electrically such as through application of an electric field or magnetic field, or may be propelled mechanically.

Motion control of movable element 210 is accomplished by processing component 130 transmitting control commands via control component 140 and interface 160 to electromechanical interface 220, which in turn converts the commands into mechanical forces directed to relocating movable element 210. As discussed above, movable element 210 may be movable in a multitude of ways, including at various speeds, rotations, and directions. Therefore, electromechanical interface 220 may be implemented using a corresponding variety of approaches. A few examples of electromechanical interfaces are ones that convert electrical signals to hydraulic pressure, electrical signals to magnetic force, and electrical signals to spring tension. Notably, electromechanical interface 220 may convert electrical signals into more than one form of mechanical energy, e.g., for implementing "push-pull" control of a valve, or for implementing both lift and rotation of an object. Further, electromechanical interface 220 may convert electrical signals from control component 140 to electrical or magnetic fields as a propulsion mechanism for device 210, without conversion to mechanical energy. Electromechanical interface 220 may be implemented in multiple devices such as a mix of actuators and hydraulic devices, or in multiple stages such as first storing energy and then applying it to movable element 210.

One category of movable element 210 includes objects that move bi-directionally along an axial path. When closed-loop control of such an object is functioning properly, the object is mechanically shifted along a defined path to a desired point at a defined distance from the point of origination. The path of the object may be predefined mechanically, but may alternatively be defined dynamically. In either case, sensor 230 may be a position sensor that feeds back information regarding the position of the object to processing component 130 via monitor component 150. Thus, exemplary subsystem 110 may include a movable element 210, movable axially and bi-directionally, controlled by electromechanical interface 220, wherein the position of movable element 210 is sensed by one or more position sensors 230.

Sensor 230 generally includes a device for sensing a property of movable element 210. Generally, but not necessarily, sensor 230 is in the vicinity of or in close proximity to movable element 210. Examples of properties that sensor 230 may sense are position, temperature, humidity, speed, color, presence or absence, and pressure. Multiple sensors 230 may sense multiple properties. The information gathered by sensor(s) 230 is transmitted via interface 170 and monitor component 150 to processing component 130.

A locator 290 generally provides an indication of a known position, and may be implemented in a broad variety of ways. For example, locator 290 may be a divet or protrusion along a metal section, such that sensor 230 senses a change in a magnetic field caused by the inconsistency in the metal span at the divet or protrusion, or such that sensor 230 physically extends or retracts at the divet or protrusion, respectively. For another example, locator 290 may be a hole through a section of material, such that sensor 230 recognizes a change in received light between the reflections off of the bulk of the material and the illumination through the hole in the material. For a further example, locator 290 may be a magnet and sensor 230 may be a Hall effect sensor that senses a change in magnetic flux as it approaches or passes by locator 290. Other sensor 230/locator 290 pairs may utilize ultrasound, high frequencies, infrared light, radio waves, electric fields, hydraulic pressure, or any other mechanisms by which position may be determined.

Considerations for selection of locator 290 include environmental conditions, shape or movement or surface conditions of movable element 210, requirements of sensor 230, mechanical or electrical interference, etc. In some applications, multiple locators 290 and/or multiple sensors 230 are desirable. For such applications, the multiple locators 290 need not be the same or similar, and the multiple sensors 230 need not be the same or similar. It may actually be desirable to deliberately introduce differences in sensor 230 or locator 290 types and/or placement to introduce signal differences for purposes of cross-checking the signals, as discussed below.

Note that locator 290 may not be necessary. For example, sensor 230 may sense a difference in reflected light, electric field, magnetic field, etc. at a distal end of movable object 220 as it passes sensor 230. As such, locator 290 may be omitted in subsystems 110 in which identification of a distal end is an object.

A vehicle transmission control system is an example of a control system 100. Switching of gears in a vehicle is generally performed within a transmission. There are many possible transmission designs, some of which employ shift rails that move parallel to a gear axle or axles. Multiple gears are mounted on the gear axle(s). To engage two gears, an engagement element may be moved by a shift rail.

Proper gear engagement is critical to the proper functioning of a vehicle, and therefore it is desirable to verify appropriate gear position before or while engaging the gears. For a manual transmission in which the gear shift lever is mechanically linked to the gears, the verification may be performed at least partially by the driver by the position of the gear shift lever or by the sound or feel of the gear engagement at the beginning of a gear change. For an automatic transmission in which there is no mechanical link to the gears, the driver generally has no opportunity or capability to verify proper gear position except as indicated visually by the gear shift lever position, e.g., the PRNDL positions (Park, Reverse, Neutral, Drive, and Low.) Consequently transmission control, and especially automatic transmission control, is often implemented with significant redundancy, fall-back modes, diagnostics, and "sanity checks" or cross-checks of feedback from multiple subsystems.

Figure 3:
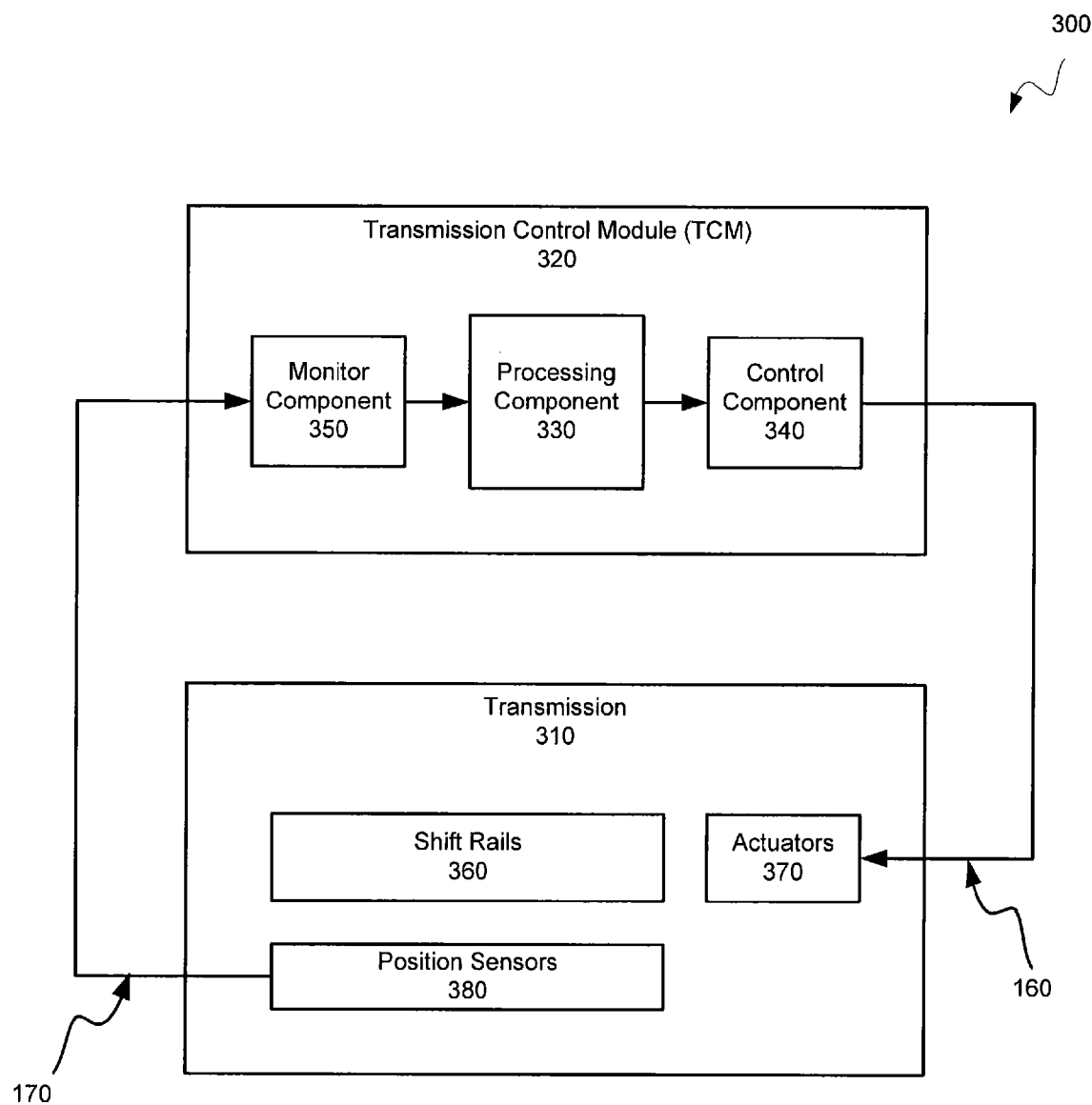
FIG. 3 illustrates an exemplary transmission control system.

FIG. 3 is an exemplary block diagram of a transmission control system 300, including a shift rail transmission 310 and a transmission control module (TCM) 320. TCM 320 is an example of a controller 120 while shift rail transmission 310 is an example of a subsystem 110. Monitor component 350 can be similarly compared to monitor component 150 while control component 340 can be compared to control component 140. The illustration of transmission 310 includes shift rails 360, actuators 370 to control the movement of the shift rails 360, and position sensors 380 (which are a subset of sensors 230) monitoring the position of shift rails 360. Other parts of the transmission 310, such as gears and axles, are not shown, for purposes of simplification.

Transmission control module (TCM) 320 includes a processing component 330, a control component 340, and a monitor component 350. The generalized function of these components was previously described with respect to system controller 120 components 130, 140 and 150, respectively. Processing component 330 is often implemented as multiple integrated circuits (ICs). For example, processing component 330 may represent two or more microcontroller ICs with associated memory ICs, and circuitry to monitor for proper functionality of all of the ICs. The function of processing component 330 includes gathering data from circuits internal or external to TCM 320, asserting commands to devices internal or external to TCM 320, providing open- or closed-loop control for various transmission subsystems, monitoring the status and condition of multiple circuits and ICs internal to TCM 320, and monitoring the status and condition of multiple devices external to TCM 320.

As an example of monitoring inputs, processing component 330 may monitor battery voltage, air temperature, atmospheric pressure, engine torque, speed, wheel slip, tire pressure, etc. to factor into the determination of appropriate gear engagement for the current conditions. As an example of asserting commands, processing component 130 may assert digital lines to one or more output drivers in control component 340, e.g., a field-effect transistor (FET) or the like, that causes the FET to provide current to an actuator in the transmission.

As an example of providing open-loop control, processing component 330 first verifies the positions of shift rails 360, and consequently the current status of gear engagement, by reading information from sensors 380 through monitor component 350, and then commands movement of one or more shift rails 360. As an example of providing closed-loop control, processing component 330 asserts a command to a FET, the FET provides current to an actuator in the transmission to move a shift rail 360, and processing component 330 receives feedback through monitor component 350 that shift rail 360 has moved to the desired position.

As an example of monitoring the status and condition of multiple ICs internal to TCM 320, processing component 330 may comprise a main microcontroller that performs monitor and control functions, a secondary microcontroller that performs a monitoring function including monitoring the functionality of the main microcontroller, and a watchdog microcontroller that monitors the operation of the secondary microcontroller. As an example of monitoring the status and condition of multiple devices external to TCM 320, processing component 330 may receive inputs through monitor component 350 from external devices in the form of serial or parallel protocol messages or in the form of digital or analog signals, and check that the various inputs are within expected ranges.

Control component 340 may include a wide variety of circuitry for implementing the desired transmission control. Control may be, e.g., through supplying current or voltage, or through a signal, as discussed above. In the exemplary implementation of system 300, control component 340 includes at least circuitry for executing the commands received from processing component 330. The circuitry depends on the actual design of the actuators in the transmission. If an actuator is "smart", i.e., contains electronics, then control component 340 is conceptually divided between TCM 320 and the actuator. In such a case the portion of control component 340 physically located in TCM 320 may comprise a low current signal output. Note that although control component 340 is shown as controlling one actuator 370, control component 340 may additionally control many different external devices of many different types, and the external devices are not limited to the context of transmission 310 control.

Monitor component 350 may include a wide variety of circuitry for implementing the monitoring function. Monitoring may be, for example, through direct-wired interface to a sensor, direct-wired interface to another electronic module, or serial or parallel data link. The circuitry depends on the actual design of the signals being monitored. If a sensor is "smart", then monitor component 350 is conceptually divided between TCM 320 and the sensor. In such a case, the portion of monitor component 350 physically located in TCM 320 may comprise a low current signal input. In the exemplary implementation of system 300, monitor component 350 is illustrated as receiving input from position sensors 380. However, monitor component 350 may additionally receive signals from many external devices of many types, and the external devices are not limited to the context of transmission 310 monitoring.

Actuators 370 may include any mechanical or electromechanical implementation for moving a shift rail 360. For example, an actuator 370 may be a solenoid that receives current from control component 340 and magnetically forces an armature to exert force on shift rail 360, or to exert force on an intermediate electrical, mechanical, hydraulic or other device that then exerts force on shift rail 360. Transmission solenoids include variable force and variable bleed solenoids.

There may be multiple position sensors 380 monitoring shift rail 360 to verify proper location during motion or at rest. Sensors 380 may be attached directly to shift rail 360, with one or more locators mounted elsewhere on transmission 310 or on the transmission 310 compartment. Alternatively, locators may be attached to shift rail 360 and sensors 380 attached to transmission 310 or on the transmission 310 compartment.

A shift-rail transmission generally has multiple shift rails 360, wherein each shift rail moves to engage one or two gears, and each shift rail 360 has one or more position sensors 380. There may be, e.g., one shift rail 360 for third gear and fifth gear, one for fourth gear and sixth gear, etc. It is highly desirable that the correct gear engage, and therefore processing component 330 may not only directly monitor position information of the shift rail, i.e. by evaluating individual sensor 380 information, but may also indirectly monitor position information, i.e. by using multiple sensor 380 readings and verifying that there are no inconsistencies in the data. An inconsistency may be apparent, e.g., if sensors 380 indicate that the transmission is in both reverse and fourth gear at the same time.

Also, as mentioned above, processing component 330 may determine that sensor 380 data is inconsistent with other types of data. For instance, one sensor 380 indicating that the transmission is in first gear may be inconsistent with vehicle speed information received from another electronic control module over a serial data link indicating that the vehicle is traveling at seventy miles per hour. As another example, processing component 330 may determine that sensor 380 data is inconsistent when transmission shaft speed as read through monitor component 150 indicates high revolutions per minute (RPM) but the sensor 380 typically associated with a gear corresponding to the high RPM indicates that the transmission is in neutral. Thus, more generally it may be desirable to compare sensor 380 data with a second source of position information that is within an expected range such as a range of vehicle speeds or transmission shaft speeds. It may further be desirable to perform additional cross-checking using other available information to determine whether an identified inconsistency actually indicates incorrect sensor 380 performance.

One example of using multiple sensors 380 to determine and cross-check shift rail 360 position is a shift rail 360 with two attached sensors 380 that respond to the presence of two locators to indicate reverse gear or forward gear engagement, or a neutral position therebetween. In one illustrative approach the locators may be magnets and sensors 380 may be Hall effect sensors that sense magnetic field. As the shift rail 360 moves, the two Hall effect sensors 380 sense the magnetic flux of their respective locators. As a Hall effect sensor 380 moves closer to a locator magnet, a current induced in sensor 380 increases. As a Hall effect sensor 380 moves away from a locator magnet, the current induced in sensor 380 decreases. In this example, the two sensors 380 will have different induced currents as they move toward or away from the two locator magnets due to their different placement. The current or measurement of current from the Hall effect sensors 380 is provided to transmission control module (TCM) 320. The use of magnets and Hall effect sensors in a shift rail system will be described in more detail below with respect to FIG. 7D.

An inconsistency in sensor 380 readings may indicate failure of one or more sensors 380 or failure of wiring to one or more sensors 380. It is therefore desirable to have the ability to detect a failure of the wiring or of one or more sensors 380. One detection means is to check for open circuits on the sensor 380 inputs to TCM 320. Open circuit detection for a set of sensors 380 is described below with respect to FIG. 9.

Stepping back to the generalized subsystem 110, there are several possible sensor/locator configurations for sensing the position of a bi-directional axial movable element 210. The configurations of FIGS. 4A-4H illustrate a few of the possible configurations.

FIGS. 4A-4D illustrate locator 290 attached to movable element 210, where sensor 230 is separate from both movable element 210 and locator 290. FIGS. 4E-4H illustrate a reverse configuration, where sensor 230 is attached to movable element 210 and locator 290 is separate from both movable element 210 and sensor 230. In either case, sensor 230 and locator 290 may be proximate to or at a distance from each other, depending on the physical property to be measured, the sensitivity of the sensor 230, and the interface circuitry of monitor component 150. For example, a Hall effect sensor is generally placed in close proximity to the magnet producing the sensed magnetic flux, and monitor component 150 may include amplifying and bandpass filtering circuitry, wherein the accuracy of the sensor 230 information is limited by the type and amount of electrical noise on the sensor 230 signal.

Figure 4A:
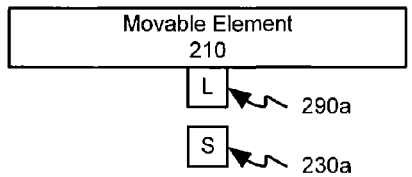
FIGS. 4A through 4H illustrate exemplary configurations for symmetric sensor placement with respect to a locator on a movable element.

FIG. 4A illustrates a simple locator 290a/sensor 230a pair in which locator 290a is attached to movable element 210. As movable element 210 moves to one side, sensor 230a senses a change in a physical property resulting from the increasing distance between sensor 230a and locator 290a. As movable element 210 then returns to its originating position, sensor 230a senses a change in a physical property resulting from the decreasing distance between sensor 230a and locator 290a. The change in physical property is reported back to processing component 130 through monitor component 150.

Multiple sensors 230 may be used for redundancy or for cross-checking, or because the length of movable element 210 is too great for one sensor 230 to adequately sense the difference in position between sensor 230 and locator 290. FIG. 4B illustrates a locator 290b attached to movable element 210, and two sensors 230b and 230c equidistant from and on different sides of locator 290b. As movable element 210 moves to the left, sensor 230b senses a change in a physical property resulting from the decreasing distance between locator 290b and sensor 230b, whereas sensor 230c senses a change in a physical property resulting from the increasing distance between locator 290b and sensor 230c.

Figure 4E:
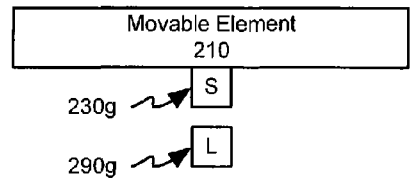
Figure 4B:
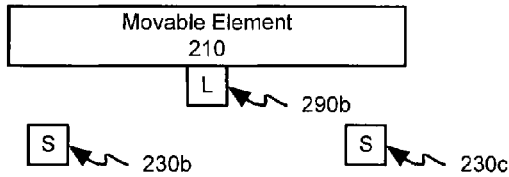
Figure 4F:
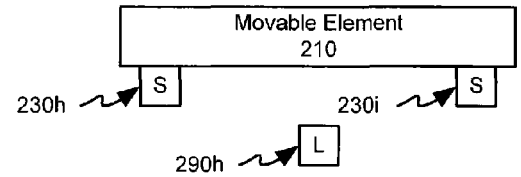
Figure 4C:
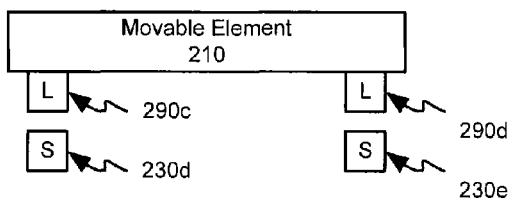

FIG. 4C illustrates use of two sensors 230d and 230e and two locators 290c and 290d. As movable element 210 moves to the left, sensor 230d senses a change in a physical property resulting from the increasing distance between locator 290c and sensor 230d and also a change resulting from the decreasing distance between locator 290d and sensor 230d. Sensor 230e senses a change in a physical property resulting from the increasing distance between locator 290d and sensor 230e and also a change resulting from the increasing distance between locator 290c and sensor 230e.

Figure 4G:
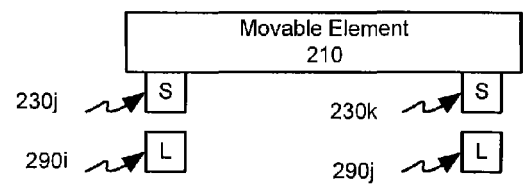
Figure 4D:
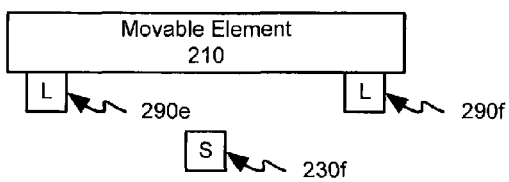

FIG. 4D illustrates the use of one sensor 230f and two locators 290e and 290f. As movable element 210 moves to the left, sensor 230f senses a change in a physical property resulting from the increasing distance between locator 290e and sensor 230f and also a change resulting from the decreasing distance between locator 290f and sensor 230f.

FIGS. 4E-4H, as noted above, illustrate sensor(s) 230 attached to movable element 210, in contrast to locator(s) 290 being attached to movable element 210 as illustrated in FIGS. 4A-4D. In each FIG. 4E-4H, the function of the sensor(s) 230 in relation to the locators is similar to that described above with respect to FIGS. 4A-4D. Therefore, sensors 230a through 230f correspond to sensors 230g through 230l, respectively, and locators 290a through 290f correspond to locators 290g through 290l, respectively.

For all of the examples in FIGS. 4A-4H, the illustration given was for movable element 210 moving to the left for ease of illustration. However, the concepts described are applicable for movement in other directions.

Sensors 230 need not be equidistant from locator 290 as shown in FIGS. 4B, 4D, 4F and 4H. Examples of the use of intentionally non-equidistant sensors 230 are described below with respect to FIG. 6. Further, although FIGS. 4A-4H illustrate the use of one or two sensors 230 and one or two locators 290 for ease of discussion, more than two sensors 230 and/or locators 290 may be used, and the concepts described expanded to cover the additional components. An increased number of sensors 230 used will generally provide increased cross-checking of sensor 230 information.

For implementations using two sensors 230, if sensors 230 are the same type of sensor arranged on different sides of a locator, then there will be an inverse correlation in at least part of the information transmitted from the sensors 230. In addition to the usefulness of the information from each sensor 230, the inverse correlative information also may be desirable for cross-checking the sensors 230 against each other. For other implementations using two sensors 230, it may be desirable to use different types of sensors 230 to, e.g., eliminate or reduce errors due to design or manufacture of the sensors 230.

The changes sensed by sensor(s) 230 are translated into electrical signals for transmission to monitor component 150. In some exemplary systems 100, sensors 230 transmit information continuously to monitor component 150. In other exemplary systems 100, sensors 230 only transmit information when there is a change in the physical property being sensed.

FIGS. 5A-5D illustrate exemplary sensor 230 signals transmitted to processing component 130 via monitor component 150. The signals are shown plotted on x-y axes where the x axis represents time and the y axis represents signal strength. Signal strength refers to the magnitude of a signal, e.g., as interpreted by processing component 130. For example, monitor component 150 may convert analog data received from a first sensor 230 to a digital signal of 0-5 Volts quantized into multiple levels (e.g., fifteen levels), and may convert frequency data from a second sensor 230 into analog signals of 0-5 Volts. Continuing with this example, processing component 130 may receive the fifteen-level digital signal and the analog signal and translate both into filtered and normalized 10-bit analog data or 10-bit PWM data. Based on a comparison of the 10-bit analog or PWM data value to an expected value, processing component 130 may determine the position of movable element 210.

Continuing with the example of the preceding paragraph, additionally or alternatively the 10-bit analog data values for multiple signals may be compared, and a result of the comparison further compared to an expected value. In this manner, processing component 130 may also determine whether a group of sensors 230 are performing acceptably. For example, if correlation between multiple signals is much lower than expected but the average signal strength of each of the signals is as expected, processing component 130 may indicate that there is an intermittent open circuit on a connection to one sensor 230 and that the sensor 230 and its connections should be checked. Thus, the processing component 330 may use the information from two sensors 230 to recognize an open circuit condition.

The x-y plots illustrated in FIGS. 5A-5D correspond to the configurations shown in FIGS. 4E-4H, respectively.

Figure 5A:
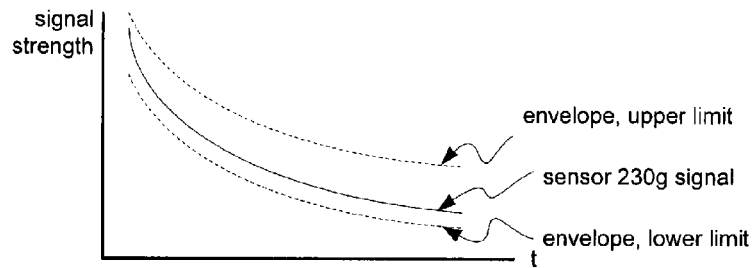
FIGS. 5A through 5D illustrate exemplary signals received from sensors.

FIG. 5A illustrates a sensor 230g signal generated as movable element 210 with attached sensor 230g, as shown in FIG. 4E, moves left, away from locator 290g. As illustrated, as the distance between sensor 230g and locator 290g increases, sensor 230g signal strength decreases. Also shown is an exemplary envelope of acceptable signal values that processing component 130 may use for determining whether movable element 210 is moving properly or is positioned correctly. An envelope in this context is a minimum and maximum value, such that if signal strength is between the minimum and maximum values, it is acceptable. In the illustration of FIG. 5A, the signal strength of sensor 230g stays within the upper and lower bounds of the envelope for the time shown, and would therefore be acceptable in this example.

Figure 5B:
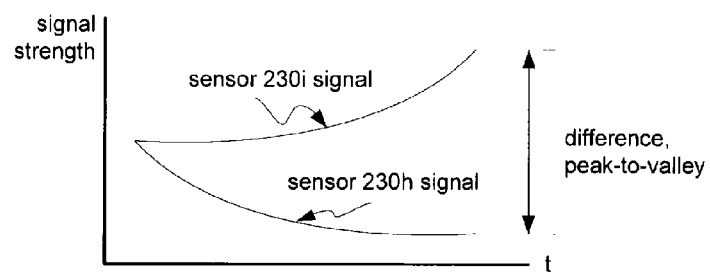

FIG. 5B illustrates an exemplary sensor 230h signal and an exemplary sensor 230i signal generated as movable element 210 with attached sensors 230h and 230i, as shown in FIG. 4F, moves left. Just prior to movement, the position information from sensors 230h and 230i is substantially the same because the two similar sensors 230h and 230i are substantially equidistant from locator 290h. As movable element 210 commences movement, and the distance between sensor 230h and locator 290h increases, sensor 230h signal strength decreases. At the same time, as the distance between sensor 230i and locator 290h decreases, sensor 230i signal strength increases. Also shown is a peak-to-valley difference measurement between signal strengths at a time when sensor 230i signal strength reaches a maximum and sensor 230h signal reaches a minimum. The difference measurement may be used by processing component 130 to compare to an expected value. In some exemplary approaches signal strength may be a function of voltage while in other exemplary approaches signal strength may be a function of current. Thus, the resulting difference analyzed by the processing component 330 is one related to voltage or current.

Figure 5C:
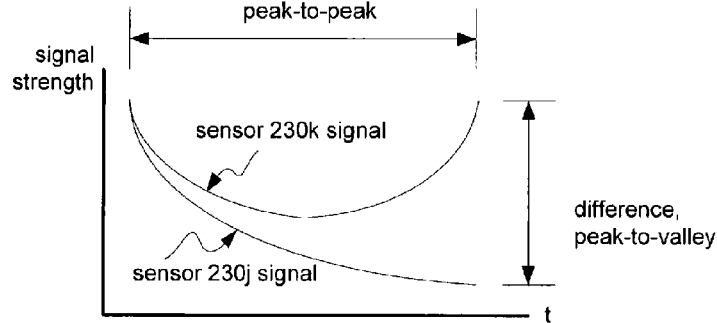

FIG. 5C illustrates an exemplary sensor 230j signal and an exemplary sensor 230k signal generated as movable element 210 with attached sensors 230j and 230k, as shown in FIG. 4G, moves left. Just prior to the movement, sensor 230j is substantially aligned with locator 290i, and sensor 230k is substantially aligned with locator 290j, such that the position information from sensors 230j and 230k, two similar sensors 230, is substantially the same, as shown. As movable element 210 commences movement, and the distance between sensor 230j and locator 290i increases, sensor 230j signal strength decreases. At the same time, as the distance between sensor 230k and locator 290j increases, sensor 230k signal strength decreases. As movable element 210 continues to move left, the distance between sensor 230j and locator 290i continues to increase, and sensor 230j signal strength continues to decrease. At the same time, the distance between sensor 230k and locator 290i decreases, and sensor 230k signal strength increases. Therefore, sensor 230j signal strength steadily decreases as movable element 210 proceeds left, whereas sensor 230k signal strength first decreases and then increases.

Also shown in FIG. 5C are two measurements: a peak-to-valley difference, and a peak-to-peak difference; either of which may be used alone or in combination by processing component 130 to compare with expected measurements, not shown. The peak-to-valley difference may represent, e.g., the difference in current between the sensor outputs. The peak-to-peak difference may represent, e.g., a difference in time which in turn represents distance of travel. The peak-to-peak difference may be used to identify issues within subsystem 110. For example, if the peak-to-peak time difference is greater than expected, processing component 130 may determine that subsystem 110 movement is too slow, indicating, e.g., that it is time for an oil change or time for a new hydraulic actuator.

Figure 4H:
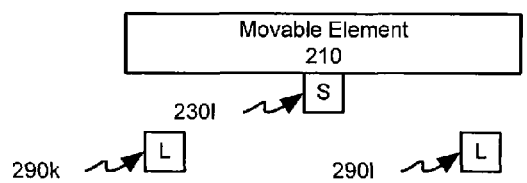
Figure 5D:
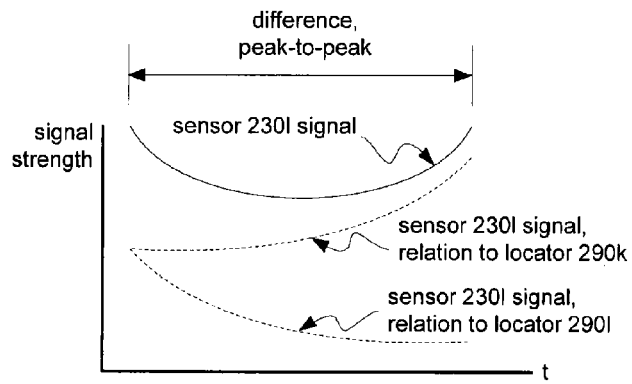

FIG. 5D illustrates an exemplary sensor 230l signal generated as movable element 210 with attached sensor 230l, as shown in FIG. 4H, moves left. Just prior to movement, the sensor 230l signal strength indicates partial proximity to both locators 290k and 290l. As movable element 210 moves left, the distance between sensor 230l and locator 290l increases so that the signal strength decreases with respect to locator 290l, while the signal strength increases with respect to locator 290k as the distance between sensor 230l and locator 290k decreases. The total signal strength with respect to both locators 290k and 290l combined is the U-shaped curve shown in FIG. 5D. Also shown is a peak-to-peak difference measurement that may be used by processing component 130 to compare to an expected measurement, not shown.

Using information from sensors 230 both individually and in a combinatorial fashion, e.g., peak-to-peak, peak-to-valley, differential, additive, correlative or other measurement, provides for cross-checking of the sensors, reducing the probability of error. Cross checking may also be used to identify processing errors.

Sensors 230 as described above with respect to FIGS. 4 and 5 were illustrated as being generally symmetrically located in relation to locators 290. However, alternative arrangements of sensors 230 and locators 290 may be more appropriate under certain circumstances. Some exemplary implementations of non-symmetric arrangements are illustrated in FIGS. 6A-6C, along with exemplary representations of signals from the sensors in FIGS. 6D-6F.

Figure 6A:
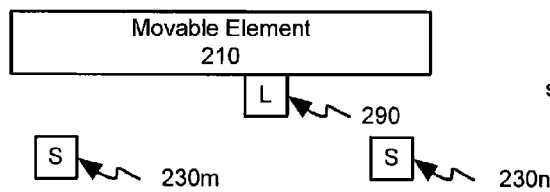
FIGS. 6A through 6F illustrate exemplary configurations for asymmetric sensor placement with respect to a locator on a movable element, and signals corresponding thereto.
Figure 6D:
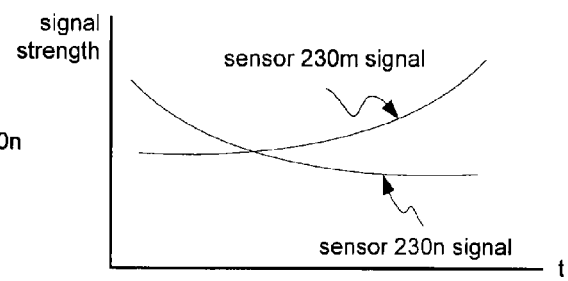

FIG. 6A illustrates a configuration in which sensors 230m and 230n are located symmetrically with respect to movable element 210, but locator 290 is offset from the center of attached movable element 210. FIG. 6D illustrates an exemplary signal plot from the sensors 230m and 230n in this configuration as movable element 210 moves left. The offset of locator 290 is reflected in the asymmetry of the signals with respect to each other.

Figure 6B:
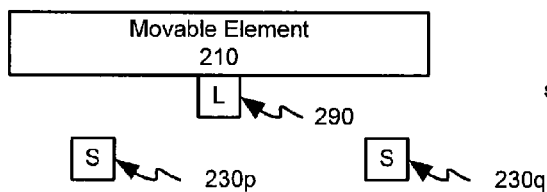
Figure 6E:
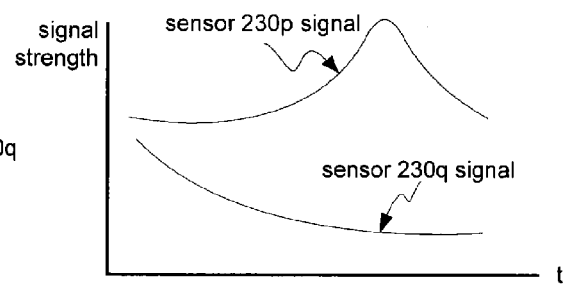

FIG. 6B illustrates a configuration in which locator 290 is attached centrally to movable element 210, but sensors 230p and 230q are asymmetrically placed with respect to locator 290. FIG. 6E illustrates an exemplary signal plot from the sensors 230p and 230q in this configuration as movable element 210 moves left. The asymmetry of sensors 230p and 230q is reflected in the asymmetry of the signals with respect to each other. Further, the plot illustrates that as locator 290 aligns with and then goes past sensor 230p, sensor 230p signal strength peaks and then begins to decrease.

Figure 6C:
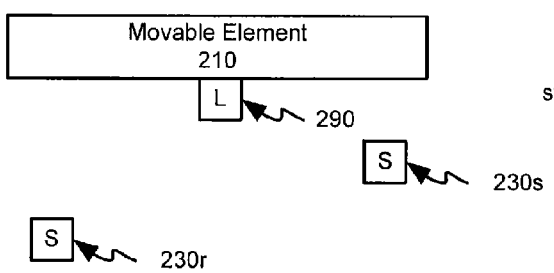
Figure 6F:
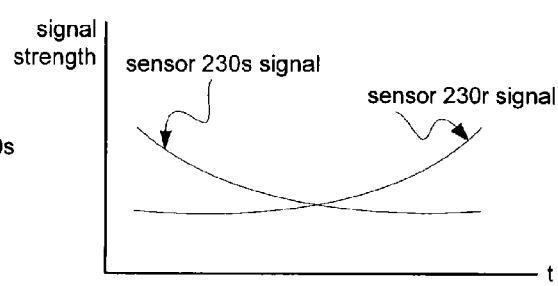

FIG. 6C illustrates a configuration in which locator 290 is attached centrally to movable element 210, and sensors 230r and 230s are located symmetrically with respect to locator 290 along an axis parallel to movable element 210 but asymmetrically along a perpendicular axis. FIG. 6F illustrates an exemplary signal plot from sensors 230r and 230s in this configuration as movable element 210 moves left. The increased distance of sensor 230r from locator 290 is reflected in the weaker signal of sensor 230r with respect to the sensor 230s signal strength. The weaker signal may, for example, be used to provide a cross-check for the stronger signal, wherein the stronger signal is provided as an input to a high voltage, higher precision interface circuit in monitor component 150, and the weaker signal may be provided as an input to a lower voltage, lower precision, and less expensive interface circuit in monitor component 150.

The configurations of FIG. 6 included intentionally introduced physical asymmetry to create signal asymmetry for signal differentiation. Generally, signal differentiation may be used to minimize common mode errors, i.e., design or environmental influences that affect the multiple sensors 230 in the same way. Alternatively or in addition, signals may be modified to provide for differentiation of the signals. For example, a signal may be inverted, offset, or delayed. An exemplary implementation of a subsystem 110 with inverted signals may be a system in which there are redundant sensors 230 and wherein the signal from one of the sensors 230 is inverted to provide a cross-check between the redundant sensors 230. This implementation may be useful to identify systemic design or manufacturing issues such as large errors at very low signal strengths. When one signal is high, the other is low, and therefore the signal that is higher at any point in time may be used to determine position, obviating the need to ascertain position data from high-error low signals. Signals may be inverted in hardware, such as in circuitry in monitor component 150, or in firmware or software, such as in the processing component 130.

As discussed above, sensors 230 generally may be embodied in many different forms, and the output signals may be in many different forms. For example, sensors 230 may have analog or digital outputs, may transmit information serially, or may output signal strength information in a voltage or current pulse-width modulated (PWM) signal. Therefore, as also discussed previously, the signals plotted on the graphs of FIGS. 5 and 6 (as well as in FIG. 7) indicate the signal strengths as interpreted by processing component 130.

The exemplary embodiments described above with respect to FIGS. 4-6 were in terms of transitory position measurement of a movable element 210 over time, for ease of understanding. However, the concepts described apply equally to static position measurement. For example, if the path of movable element 210 is a known fixed length, then time t on the x axis of the plots in FIGS. 4-6 can be replaced with distance d. The plot for a particular signal would then indicate signal strength of the corresponding sensor 230 at each point along the path of travel a distance d from the origin of travel of the sensor 230. Thus, if position d is known, signal strength may be verified against an expected value; and if signal strength is known, position d may be verified against an expected value. An expected value may be retrieved from a look-up table or the like, may be predicted using known prediction techniques, may be determined based on information from elsewhere such as a speed or torque signal, may be determined based on information from another sensor 230, etc. FIGS. 5 and 6 illustrated some examples of comparing signals from two sensors 230. Such comparisons, and others, may be used to determine movable element 210 position by analyzing the two sensor 230 signals.

FIGS. 5A-5D, 6D, 6E and 6F were described in terms of movable element 210 moving in one direction from a middle point. However, the analysis would be similar if the movable element 210 started from one end point and moved toward the other end point. FIG. 7 is arbitrarily described in terms such that the plots of signal strength versus time or distance are with respect to a movable element 210 starting at the far left of travel (the origin point) and moving to the far right of travel (the end point.)

FIG. 7 illustrates an exemplary subsystem 110 including a movable element 210, two sensors 730 and 740, and two locators 710 and 720.

Figure 7A:
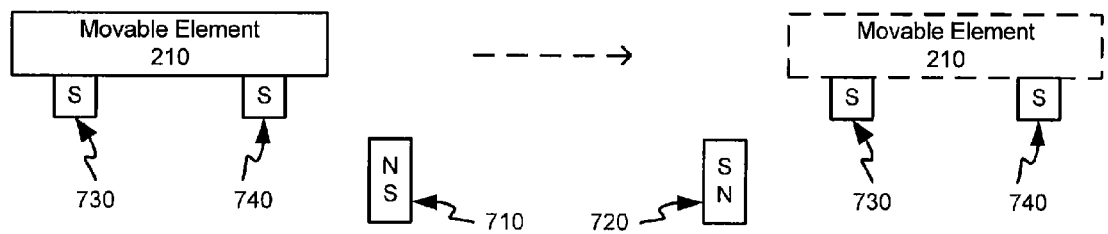
FIGS. 7A through 7D illustrate an exemplary position detection configuration using magnetic locators and Hall effect sensors, with signals corresponding thereto.

FIG. 7A illustrates an exemplary movable element 210 with attached sensors 730 and 740, and magnets 710 and 720 functioning as locators 290. Magnets 710 and 720 are placed with opposite polarity, as shown, and each is attached to an iron-based (e.g., steel) plate (not shown) for termination of the magnetic flux. In the illustrated example sensors 730 and 740 are Hall effect sensors that output current in response to a change in magnetic flux density. Although the current from the Hall effect sensors may be translated into many forms for communication of signal strength to monitor component 150, for purposes of FIG. 7 the output is discussed in terms of current for simplicity. Movable element 210 is shown before commencing movement as being positioned such that sensors 730 and 740 are completely to the left of magnets 710 and 720, and at completion of movement being positioned such that sensors 730 and 740 are completely to the right of magnets 710 and 720 as shown by the dashed position of movable element in FIG. 7A. As movable element 210 moves right past magnets 710 and 720, sensors 730 and 740 respond by outputting current.

Figure 7B:
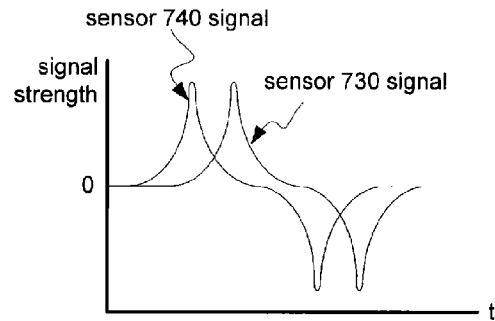

FIG. 7B illustrates an exemplary plot of the output currents from sensors 730 and 740 in the form of signal strength as interpreted by processing component 130. As a sensor 730 or 740 approaches magnet 710, the sensor 730 or 740 outputs a progressively larger positive current. Then, as sensor 730 or 740 moves past magnet 710, the sensor 730 or 740 outputs a progressively smaller positive current. Similarly, for magnet 720, oppositely polarized to magnet 710, as sensor 730 or 740 approaches magnet 720, the sensor 730 or 740 outputs a progressively larger negative current. Then, as sensor 730 or 740 moves past magnet 720, the sensor 730 or 740 outputs a progressively smaller negative current. The result on each plot of output current for sensor 730 or 740 is a positive peak representing proximity to magnet 710 and a negative peak representing proximity to magnet 720. Additionally, the plots of the output currents for sensors 730 and 740 are offset from each other due to the physical distance between the sensors 730 and 740.

Figure 7C:
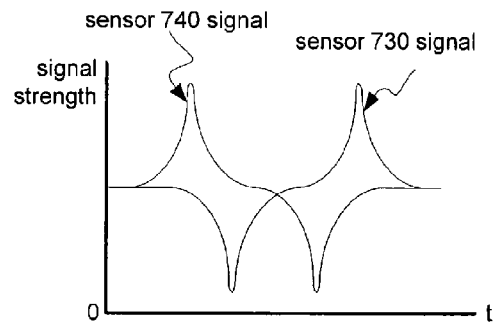

The Hall effect sensors 730 and 740 may be selected to be opposite polarity from each other such that one outputs positive current for North to South magnetic fields and the other outputs negative current for North to South magnetic fields. With such a configuration, the peaks of the output current from the sensors 730 and 740 will have opposite phase in addition to offset. Offset plus phase inversion is illustrated in FIG. 7C. FIG. 7C also illustrates a vertical axis offset added to both signals so that the signal strength is always a positive value. An offset may be added in any manner, e.g., by shifting the sensor ground. The information provided by the phase or offset signals and utilized by the processing component 330 to determine the position of a movable element 210 will be substantially the same information, but may require less interface circuitry within the monitor component 150. In some approaches the processing component 330 will identify a phase difference between the first sensor data and the second sensor data to determine component location. An offset may be added either at sensors 730 and 740 or at monitor component 150. Magnet 710 and 720 and sensor 730 and 740 placement may be varied to achieve other output signal characteristics as desired. Some examples of sensor/locator configurations were described above with respect to FIGS. 4 and 6.

An exemplary implementation using the sensor/locator configuration of FIG. 7A is a position sensing configuration for verifying gear engagement. Movable element 210 may be attached to a gear engagement element, such that movement of movable element 210 left and right causes the gear engagement element to engage or disengage gears, respectively. Sensors 730 and 740 may be attached to a movable element 210 and magnets 710 and 720 may be located near movable element 210. As movable element 210 and attached sensors 730 and 740 move past magnets 710 and 720, sensors 730 and 740 produce signals such as those illustrated in FIG. 7B or 7C. Sensors 730 and 740 and magnets 710 and 720 may be arranged in such a way that at least one of the peaks of the signals from sensors 730 and 740 indicates that the gears are disengaged or disengaging.

Returning now to the transmission example, shift rails 360 are moved back and forth to engage or disengage gears when shifting between gears or when shifting into neutral. Each shift rail may at least partially control gear engagement for two different gears. For example, a shift rail may control a gear engagement element that moves bi-directionally to engage different gears on either side of its travel path. In a dual-clutch shift-rail transmission, there may be multiple shift rails 360 that may be controlled to engage one gear while at the same time disengaging another, for smooth shifting and continuous torque. The processing component 330 determines the position of shift rails 360 to monitor the engagement of one gear concurrent with the disengagement of another during an upshift or downshift of the transmission 310. Movable element 210 may be one shift rail in either a single or dual clutch transmission that controls a gear engagement element for engaging reverse gear and first gear. Sensors 730 and 740 may be placed to distinguish between reverse gear engaged position, first gear engaged position, and both gears disengaged, i.e. neutral. Sensors 730 and 740 may output signals similar to those illustrated in FIG. 7B, where the first peak of the sensor 740 signal may indicate that reverse gear is beginning to disengage. The second peak of the sensor 730 signal may indicate that first gear is fully engaged. For some part of the signal plot between the first peak of the sensor 730 signal and the second peak of the sensor 740 signal, the transmission is considered to be in neutral.

Figure 7D:
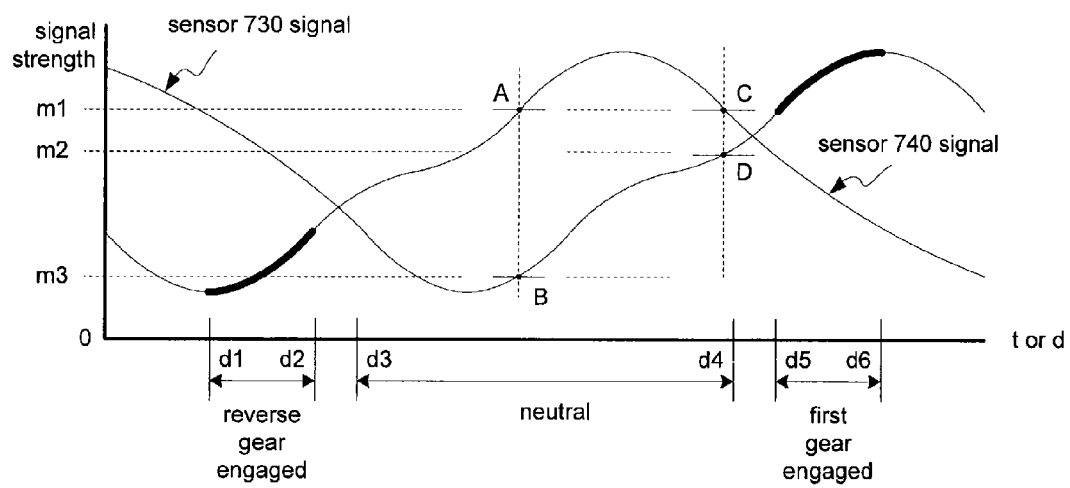

FIG. 7D illustrates the sensor 730 and 740 signals for a reverse/first gear shift rail including attached sensors 730 and 740, and with separate magnets 710 and 720 of opposite polarity from each other. In this exemplary embodiment, sensor 730 or 740 proximity to magnet 710 causes a negative current, proximity to magnet 720 causes a positive current, and the signals of FIG. 7D are offset positively. FIG. 7D is essentially an inverted and expanded version of FIG. 7B. The bold portion of the sensor 740 signal indicates the range of sensor 740 positions in which reverse gear is at least partially engaged. Similarly, the bold portion of the sensor 730 signal indicates the range of sensor 730 positions in which first gear is at least partially engaged. Between the reverse gear engaged and first gear engaged positions is a neutral position, with no gear engaged.

Continuing with the illustration of FIG. 7D, and referencing the configuration of FIG. 7A, it can be seen that much information may be gleaned from the two signals. While sensor 740 is between distance d1 and d2 from its point of origin, the strong signal from sensor 740 is consistent with reverse gear being engaged. The weakening signal from sensor 730 is also consistent with reverse gear being engaged because in the reverse gear engaged position, sensor 730 is far from magnets 710 and 720. Therefore, position information indicating reverse gear engagement is determined directly from sensor 740 and is cross-checked by considering the consistency of the information from both sensors 730 and 740.

In FIG. 7A, a neutral shift rail position, i.e. where neither reverse gear nor first gear is engaged, is a position in which sensor 740 is physically to the right of locator 710 and sensor 730 is physically to the left of locator 720. In FIG. 7D, this is the portion of the graph between points d3 and d4. Therefore, each signal separately indicates a neutral position, and the information from each signal may be used to cross-check the other signal.

While sensor 730 is between distance d5 and d6 from its point of origin, the strong signal from sensor 730 is consistent with first gear being engaged. The weakening signal from sensor 740 is also consistent with first gear being engaged because in the first gear engaged position, sensor 740 is far from magnets 710 and 720. Therefore, position information indicating first gear engagement is determined directly from sensor 730 and is cross-checked by considering the consistency of the information from both sensors 740 and 740.

Using another method to determine where the shift rail is at any time, the signal strengths of the sensors 730 and 740 are compared. For example, if sensor 740 signal is at a magnitude m1, from a look-up table it can be determined that there are two possible sensor 740 locations that will cause sensor 740 signal strength to be magnitude m1, as denoted on FIG. 7D as points A and C. By looking at the sensor 730 signal, however, it can be determined which point A or C is correct. If it is point A, then sensor 730 signal will be at point B and thereby have a signal 730 strength of magnitude m3. If it is point C, then sensor 730 signal will be at point D and thereby have a signal 730 strength of magnitude m2. In similar manner, other positions may be determined. By determining position indirectly in this way, the neutral state, i.e. no gear engagement, may be known without implementing a sensor indicating the neutral position directly.

Further, the use of two sensors such as sensors 730 and 740 in FIG. 7D allows for a determination of direction of travel of a shift rail. For example, as the signal strength of sensor 740 decreases to magnitude m1, the shift rail may be moving towards engagement of first gear or towards engagement of reverse gear. The signal strength of sensor 730 may be used to indicate direction of travel. Thus, for example, if sensor 730 signal strength is increasing, the shift rail is moving towards engagement of a forward gear, but if sensor 730 signal strength is decreasing, the shift rail is moving towards engagement of a reverse gear.

In general, placement of sensors 230 and locators 290, plus selection of types of sensors 230 and locators 290, along with selection of monitor component 150 circuitry, allows for a broad variety of monitoring and cross-checking of a subsystem 110.

FIG. 8 illustrates two exemplary position monitoring configurations for a four-rail shift rail transmission system. In each of FIGS. 8A and 8B there are four shift rails 360 shown, however, the concepts described apply equally to a shift rail system including fewer or more than four shift rails. Each of the shift rails 360 move axially and bi-directionally to engage one of two gears. Each shift rail 360 may additionally have a neutral position between the gear engaged positions. The four shift rails 360 include one shift rail to engage Reverse or $1^{st}/2^{nd}$ gear (RN1/2), one shift rail to engage $3^{rd}$ or $5^{th}$ gear (3N5), one shift rail to engage $4^{th}$ or $6^{th}$ gear (4N6), and one shift rail to engage the Lock or Unlock mechanisms (LU). In this implementation, the Lock and Unlock mechanism selects between $1^{st}$ and $2^{nd}$ gear and between Reverse High and Reverse Low. The LU mechanism may perform additional selection functions, such as selecting between $6^{th}$ gear and a seventh gear. Each shift rail 360 is shown with one or two sensors 230 and one or two locators 290. The placement of the sensors 230 and locators 290 are not limited to those illustrated, and the options include at least the configurations illustrated in FIGS. 4D-4H, 6A-6C, and 7A. Further, more than two sensors 230 and/or locators 290 may be used for any of the shift rails 360.

As discussed above, it is very important to know what position each shift rail 360 is in before and/or during moving the shift rail. Therefore, the position of each shift rail 360 as indicated by a sensor 230 is generally verified in some manner through a cross-check or sanity check, wherein a cross-check includes comparing actual position information, and sanity checking includes verifying that the position information is consistent with some other type of information such as a speed measurement. In the implementation illustrated in FIGS. 8A and 8B, position is detected through at least one sensor 230. Cross-checking of the information from a sensor 230 may be provided using a redundant sensor 230. Cross-checking of data from a sensor 230 may alternatively be provided within the transmission control module (TCM) 320 by having two processors read sensor 230 and compare the determined positions. Sanity checking may be employed by comparing the position data from sensors 230 with transmission speed or some other indication. For example, if a sensor 230 indicates that Reverse gear is engaged but other information indicates forward motion at high speed, then the sensor 230 data is inconsistent with the other information and reme-dial action is necessary. Remedial action may be to perform diagnostics, or may be to enter a limp mode of operation, which allows the vehicle to at least move to the side of the road before shutting down.

FIG. 8A illustrates an exemplary four-rail transmission system using only four position sensors 230 to identify the twelve shift rail 360 positions (Reverse, $1^{st}/2^{nd}$, $3^{rd}$, $4^{th}$, $5^{th}$, $6^{th}$, Unlock, and Lock engaged, and Neutral on each of four shift rails). More generally, if the number of shift rails 360 is equal to the variable N and one position sensor 230 is attached to each shift rail, each sensor indicates whether the shift rail is in a position of engagement of a first gear, a position of engagement of a second gear, or in the neutral position, such that the N position sensors indicate three times N gear engagement positions. Although each rail is shown in the exemplary system of FIG. 8A as having three positions, a rail may include less than three positions. For example, the Lock Unlock rail may not have a neutral position, and the information received from the sensors 230 would indicate only Lock, Unlock, and the transition between Lock and Unlock for this rail.

A fifth sensor 230 is included in FIG. 8A as a redundant cross-checking sensor on the RN1/2 shift rail. Sensors 230 on rails 3N5 and 4N6 may be sanity-checked with transmission speed. Sensor(s) 230 on each rail may further be cross-checked against sensor(s) 230 on other rails. For example, if the RN1/2 sensor(s) indicate that the transmission is in Reverse, then the sensors 230 on the 3N5 and 4N6 rails would be expected to indicate that gears 3, 4, 5, and 6 were disengaged. The data from each of the sensors 230 may be cross-checked internally by TCM 320, as discussed above FIG. 8B also illustrates a four-rail transmission system using only four position sensors 230 to identify the twelve shift rail 360 positions. Three additional sensors 230 are included for cross-checking the RN1/2, 3N5, and 4N6 rail positions. Cross-checking within the TCM may also be used, and sanity checking with other indications may be performed.

Sensors 230 are read by at least one processor in TCM 320. Diagnostics may be performed on sensors 230 by TCM 320 in addition to the cross-checking and sanity checking discussed above. Diagnostics may include open circuit detection, short circuit to ground, short circuit to battery, over-current, and over-temperature. Open circuit detection is especially important due to the number of wires, splices, and connectors in the wire harness in a vehicle, as well as the physical stress on the wire harness and on the connections to the printed circuit board within TCM 320, any of which may become separated, detached or broken. Open circuit detection is discussed further below.

Figure 9:
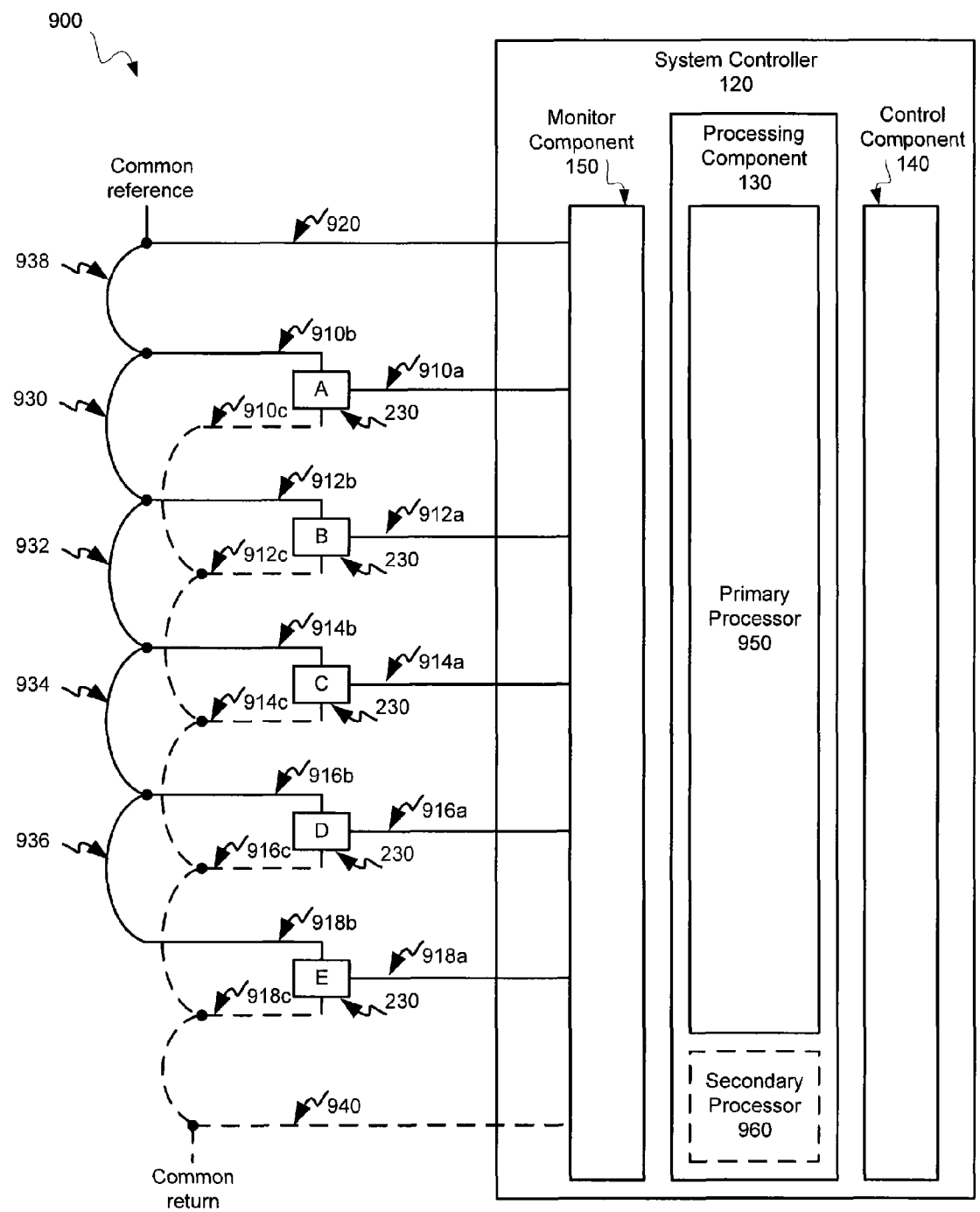
FIG. 9 illustrates an exemplary configuration for reading multiple sensors with a common reference.

FIG. 9 illustrates a generic, exemplary system 900 for reading sensors 230 and performing diagnostics. System 900 includes a system controller 120 and five sensors 230, labeled A-E. Sensors A-E may be the sensors A-E from FIG. 8A. Additional sensors 230 as illustrated in FIG. 5B are not shown but may be similarly interfaced to controller 120. Monitor component 150 interfaces sensors 230 to processing component 130. Processing component 130 is illustrated as including a primary processor 950 and an optional secondary processor 960, both of which represent any one or more known computing devices. The functions of processing component 130 may be divided between primary processor 950 and secondary processor 960. Alternatively, primary processor 950 may perform the processing component 130 functions while secondary processor 960 performs monitoring of one or more of primary processor 950, other components within processing component 130 or other system controller 120 components. If, for example, system 900 represented a transmission control system, as in the example given above, then primary processor 950 may be, for instance, a main microcontroller controlling actuators in the transmission and reading shift rail position sensors 230. At the same time, secondary processor 960 may, for example, read the position sensors 230, monitor the performance of primary processor 950, and exert control over the actuators upon a failure of the primary processor 950 or the sensors 230.

A primary processor 950 and a secondary processor 960 each may be, in addition to other functionality, programmed to perform one or more of reading sensors 230, cross-checking information from the sensors 230, and monitoring the other processor. For example, primary processor 950 may read a first sensor 230 on a shift rail for its functional information and read a second sensor 230 on the same rail for cross-check information, while the secondary processor 960 may read the second sensor 230 for its functional information and read the first sensor 230 for cross-check information. The primary processor 950 and secondary processor 960 may then share the corresponding position determination with each other.

Sensors 230 are illustrated in FIG. 9 as having two or three connections, illustrating implementation with 2-wire or 3-wire sensors 230, respectively. By way of example and not as a limitation, a 2-wire sensor may be a planar sensor, sensing motion in a two dimensional plane whereas a 3-wire sensor may sense motion tri-axially, in a three-dimensional space.

Referring to FIG. 9 for examples of implementations using 2-wire and 3-wire sensors 230, sensor A has connections 910a and 910b if a 2-wire sensor and connections 910a, 910b and 910c if a 3-wire sensor. Connections 910a, 910b and 910c are representative of connections 91xa, 91xb, and 91xc, respectively, where x is one of 0, 2, 4, 6, or 8. Connection 910a is the sensor A input to system controller 120 and specifically to processing component 130 through monitor component 150. Connection 910a may deliver current or may be a relative voltage, representing a measurement of the condition being measured. For example, if pressure is measured, sensor A may output a current proportional to the pressure to processing component 130 via connection 910a. Connection 910a may alternatively provide information using a serial protocol, or through current or voltage pulse-width modulation.

Connection 910b of sensor A is a reference for sensor A. For example, if sensor A outputs current proportional to pressure, there must be a source of current to sensor A. In such a case, current would be provided to sensor A through connection 910b. As another example, sensor A may output relative voltage on connection 910a, wherein the voltage on 910a is relative to the voltage at connection 910b.

Connection 910c of sensor A is a return wire for a 3-wire sensor 230, required for the 3-wire sensor to operate properly. The return wire may be, e.g., connected to a ground or a floating ground in controller 120. Generally but not necessarily, a 3-wire sensor 230 has better accuracy than a 2-wire sensor 230.

Connection 920 is illustrative of a common reference connected within the wire harness to each of the sensors A-E. Alternatively, each reference 91xb may be provided directly from controller 120, not shown.

Connections 930-936 represent electrical connection between different ones of the connections 91xb and connection 920 for a configuration with a common reference from controller 120.

Connections 91xc, the return wires for 3-wire sensors, may be connected to each other, and may also be connected to system controller 120 through connection 940. Alternatively, each return 91xc may be provided directly to controller 120, not shown.

When sensors 230 are connected as shown in system 900 with connections 930-936 and a common reference 920 to system controller 120, the electrical connections between the various wires may be through wire splices. For example, connection 936 may be spliced to connections 934 and 916b, connection 934 may be further spliced to connections 932 and 914b, connection 932 may in turn be further spliced to connections 930 and 912b, and connection 930 may be spliced to connection 910b and the common reference connection 938, which may be spliced to connection 920 from system controller 120. If any of the splices fail, one or more sensors 230 may no longer function properly. Table 1 below summarizes the results for open circuits on the various connections 930-936. As one example, if the splice of connection 934 to connections 932 and 914b fails, then sensors D and E will not function properly, and cannot be read by system controller 120. This situation is an open circuit of connection 934. The fourth column of Table 1 is titled "Open circuit connection 934," and the entries corresponding to sensors D and E are "Cannot read D" and "Cannot read E," respectively. The terms "Can read" and "Cannot read" refer only to whether or not the controller 120 is able to acquire valid data according to what the sensor 230 is sensing. The sensor 230 may still output a signal on connection 91xa if its reference connection 91xb is disconnected, but the signal will represent invalid data.

TABLE 1

Open circuits, impact on sensor readings

| Sensor | Open circuit on connection 930 | Open circuit on connection 932 | Open circuit on connection 934 | Open circuit on connection 936 |
|---|---|---|---|---|
| A | Can read A | Can read A | Can read A | Can read A |
| B | Cannot read B | Can read B | Can read B | Can read B |
| C | Cannot read C | Cannot read C | Can read C | Can read C |
| D | Cannot read D | Cannot read D | Cannot read D | Can read D |
| E | Cannot read E | Cannot read E | Cannot read E | Cannot read E |

Table 1 may be used, e.g., when planning a wire harness design, to determine where to splice in sensors 230 for the most system 900 reliability.

Instead of splices, the common reference may comprise a common conductive surface to which the individual wires 91xb are attached. In this case, an open circuit condition on any of the connections 91xb results in loss only of the corresponding sensor 230.

The discussion above with respect to open circuits on connections 930, 932, 934, and 936 applies to both 2-wire and 3-wire sensor connections.

In similar fashion to the wire splices for the common reference, the connections 91xc of the common return for the 3-wire sensors may be spliced together in a wire harness, and if one of the splices becomes disconnected, one or more sensors may no longer function properly. Instead of splices, the common return may comprise a common conductive surface to which the individual wires 91xc are attached. In this case, an open circuit condition on any of the connections 91xc result in loss only of the corresponding sensor 230 reading.

For the configuration illustrated in FIG. 9, loss of the common reference or, in the case of 3-wire sensors, the loss of the common reference or the common return, will cause a loss of information from all of the sensors 230. Therefore, there may be redundant common reference wires and/or common return wires included in the system.

Alternative approaches to the illustration in FIG. 9 may include multiple references and/or returns for the sensors 230. The sensors 230 may be allocated to the references such that minimal function is possible if one reference is open-circuited. For example, in the four-rail shift rail transmission system described above, rail RN1/2, 4N6, and LU sensors may be allocated to a first reference, and the RN1/2 redundant sensor and rail 3N5 sensor may be allocated to a second reference. If the first reference is lost, the system will still be able to identify R, $1^{st}/2^{nd}$, $3^{rd}$ and $5^{th}$ gear engagement with the corresponding neutral positions, and may limit the system to using only these gears. If the second reference is lost, the system will still be able to identify R, $1^{st}/2^{nd}$, $4^{th}$ and $6^{th}$ gear engagement with the corresponding neutral positions, and may limit the system to using only these gears. In either case, although the shifting between gears may be less than optimal, the vehicle will be able to drive until reaching a destination where service may be obtained.

As discussed above, any number of shift rails 360, sensors 230, references and returns may be implemented within a transmission system. The concepts described above may be extended to cover the various possible approaches.

Therefore, more generally let N represents the number of position sensors 380 wherein each sensor is associated with one of N shift rails in shift rail transmission system 310. Each of the N shift rails 360 moves in one direction to engage a first gear and moves in another direction to engage a second gear, with a neutral position therebetween. Thus, the N shift rails 360 operate to engage two times N gears. Moreover, the two times N gears may be divided into subsets of gears such that the group of gears allocated to a subset is sufficient to enable operation of the transmission in select gears such as forward and reverse and over a predefined range of transmission shaft speeds.

Each sensor 380 is electrically coupled to a control module that provides an electrical reference to the sensor and receives data in the form of an electrical signal from the sensor. Moreover, the set of N sensors 380 may be divided into subsets and each subset is provided a common reference from the TCM 320. The processing component 330 of TCM 320 determines from data from each sensor 380 whether the shift rail 360 associated with that sensor is in a position of engagement of a first gear, a position of engagement of a second gear, or in a neutral position. When the two times N gears are subdivided into subsets of gears the sensors 380 may be similarly allocated into the same subsets. Therefore, if the common reference to one of the subsets of N sensors becomes unavailable, the associated subset of gears may be disabled.

To provide redundancy there may be a second source of position information for at least one of the shift rails 360. For example, the second source of position information for a rail may be a second position sensor on that rail. Another source of position information may be external information such as vehicle speed or transmission shaft speed as discussed above.

Figure 10:
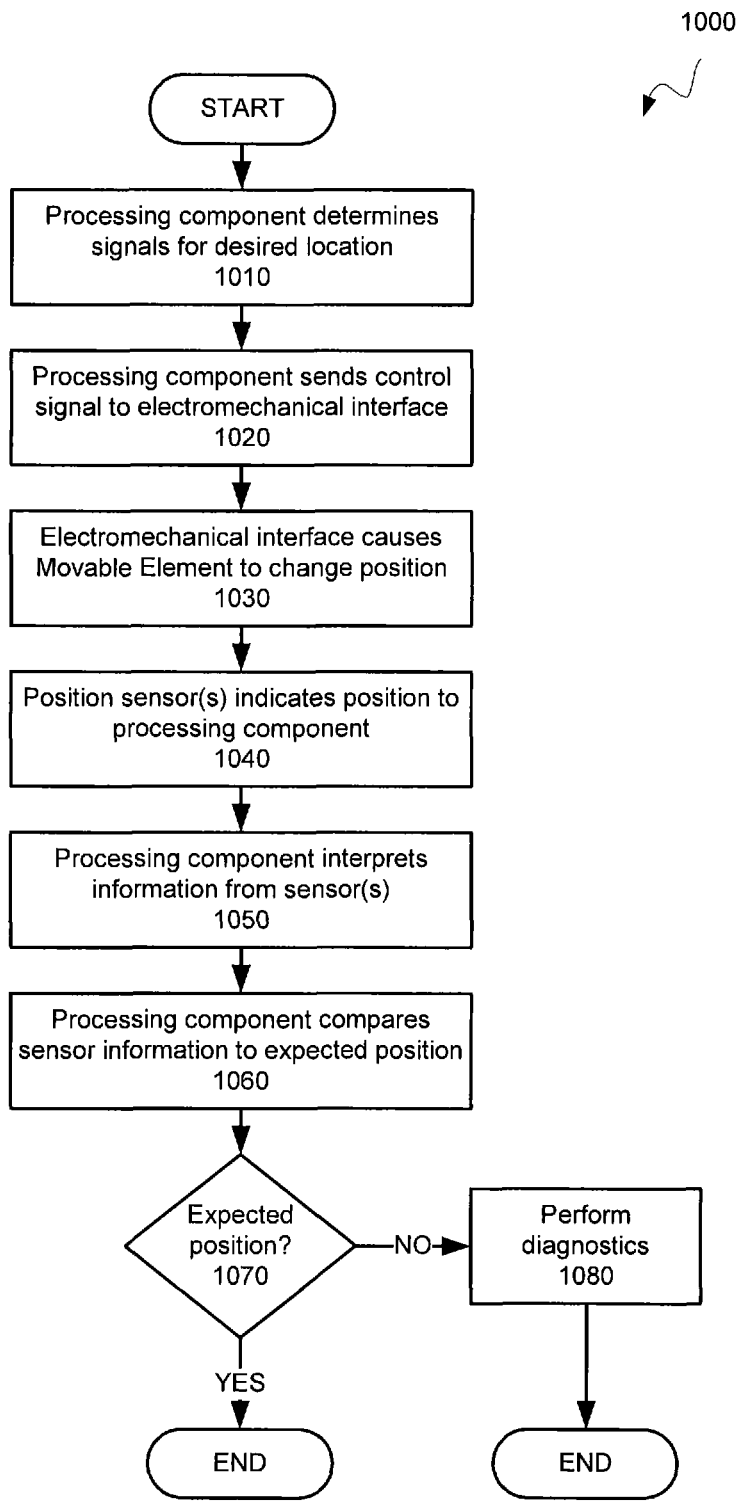
FIG. 10 illustrates an exemplary process for system control including position sensing.

Having described how sensor information may be used to determine position information for a movable element 210 such as a shift rail 360, including a description of monitoring position sensors for shift rail transmission gear engagement, an exemplary implementation of a position monitoring process will be described. FIG. 10 illustrates a process 1000 for an exemplary feedback system 100 for controlling and monitoring a movable element 210. Process 1000 may be implemented in either a closed- or open-loop control system.

In 1010, a processing component 130 first determines signals necessary for moving movable element 220 to a desired location. The necessary signals may be determined in part from the error signals between position indicated by sensors 230 and an expected position. The necessary signals are also determined, e.g., after receiving a request for a new location, or after determining a change in environmental variables such as temperature and pressure.

In 1020, processing component 130 sends the signals via control component 140 to electromechanical interface 220. For example, as discussed above, such a signal may include a command to a field effect transistor (FET) to provide current to an actuator in transmission system.

In 1030, electromechanical interface 220 converts the received signals to mechanical energy and causes movable element 210 to change position. For example, as discussed above, an electromechanical interface 220 may include an actuator that receives current from a FET in control component 140, wherein windings in the actuator generates a magnetic field in response to the current and forces a rod to move, which in turn directly or indirectly forces movable element 220 to a new position.

In 1040, position sensor(s) 230 indicates the position of movable element 210 to processing component 130 by transmitting signals to processing component 130 via monitor component 150. For example, as discussed above, a transmitted signal may include a serial data signal sent to monitor component 150, which converts the data to digital signals for receipt by processing component 130.

In 1050, processing component 130 interprets the signals from the sensor(s) 230. For example, as discussed above, such interpretation may include conversion of different types of data, received from different sensors 230 through monitor component 150, into normalized 10-bit analog data.

In 1060, processing component 130 compares the position information to information reflecting an expected position for movable element 210. For example, as discussed above, comparisons may include, but are not limited to: comparing the distance between peaks of a received sensor 230 signal to an expected difference between peaks; comparing an absolute value of a peak to an expected value of a peak; and comparing the sensor 230 signal over time to an envelope of the expected signal. Note that a combination of comparisons may be used also.

In 1070, if the position of movable element 210, as reported by sensor(s) 230, is acceptable based on the comparison of the reported position with the expected position, then process 400 ends. If, however, the position of movable element 210, as reported by sensor(s) 230 is unacceptable, then process 400 continues at 1080. For example, as discussed above, acceptability may include average signal strength exceeding a threshold, and signal strength remaining within an expected envelope.

In 1080, processing component 130 performs an optional diagnostics process or sub-process. The diagnostics process or sub-process may include further signal comparisons to identify which component in the system may be experiencing a failure. For example, if the average value of the signal from one sensor 230 is very low, it may indicate that the sensor 230 has an intermittent open circuit somewhere along the feedback path to processing component 130. Following 1080, process 1000 ends.

Process 1000 may also be executed in a loop, not shown, to provide for continuous position monitoring and control.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A system, comprising:
    a number N of position sensors, each sensor associated with one of N shift rails in a shift rail transmission system, wherein each sensor is electrically coupled to a control module having an electrical reference to the sensor and receives data in the form of an electrical signal from the sensor; and wherein the set of N sensors is divided into subsets and each subset is provided a common reference from the control module;
    a processing component that determines from data from each sensor whether the shift rail associated with that sensor is in a position of engagement of a first gear, a position of engagement of a second gear, or in a neutral position: and
    a second source of position information for at least one of the N shift rails, wherein the source of position information for an individual rail M is a second position sensor on rail M.

2. The system of claim 1, wherein each of the N shift rails moves in one direction to engage the first gear and moves in another direction to engage the second gear, such that the N shift rails operate to engage two times N gears.

3. The system of claim 2, wherein the two times N gears are divided into subsets of gears such that the group of gears allocated to a subset is sufficient to enable operation of the transmission in forward and reverse and over a predefined range of transmission shaft speeds.

4. The system of claim 3, wherein the sensors allocated to a subset of the N sensors are associated with the gears allocated to a subset of the two times N gears.

5. The system of claim 4, wherein if the common reference to one of the subsets of N sensors becomes unavailable, the associated subset of gears is disabled.

6. The system of claim 2, wherein the second source of position information for at least one of the N shift rails, and the second source of position information is inferred gear from transmission shaft speeds.

7. The system of claim 6, wherein the processing component determines from the position of engagement of the shift rail an expected range of shaft speeds, and verifies that the shaft speed received as the second source of position information is within the expected range.

8. The system of claim 4, wherein the N shift rails are four shift rails, configured as follows:
    a first rail with Reverse, Neutral and First and Second gear engagement positions;
    a second rail with Third gear, Neutral, and Fifth gear engagement positions;
    a third rail with Fourth gear, Neutral, and Sixth gear engagement positions; and
    a fourth rail with Unlock and Lock engagement positions and a transition position between Unlock and Lock.

9. The system of claim 8, further comprising a second position sensor on the first rail, wherein
    one subset of gears includes Reverse gear, First or Second gear, Third gear, and Fifth gear;
    one subset of gears includes Reverse gear, First or Second gear, Fourth gear, and Sixth gear; and
    one subset of sensors includes a sensor on the first rail, a sensor on the third rail, and a sensor on the fourth rail; and
    one subset of sensors includes a sensor on the first rail and a sensor on the second rail.

10. The system of claim 4, wherein the N shift rails are four shift rails, configured as follows:
    a first rail with Reverse, Neutral and First and Second gear engagement positions;
    a second rail with Third gear, Neutral, and Fifth gear engagement positions;
    a third rail with Fourth gear, Neutral, and Sixth gear engagement positions; and
    a fourth rail with Unlock and Lock engagement positions and a transition position between Unlock and Lock.

11. The system of claim 10, further comprising a second position sensor on each of the first rail, the second rail, and the third rail, wherein the processing component cross-checks the information from one sensor on a rail with the information from the other sensor on the rail.

12. The system of claim 11, wherein
    one subset of sensors includes a sensor on the first rail, a sensor on the second rail, a sensor on the third rail, and a sensor on the fourth rail; and
    one subset of sensors includes a sensor on the first rail, a sensor on the second rail, and a sensor on the third rail; and wherein if the common reference to one of the subsets of sensors becomes unavailable, the processing component relies on the position information from the other subset of sensors.

13. The system of claim 11, wherein the processing component includes two processors, each of which receives sensor data from one of the subsets of sensors.

14. The system of claim 13, wherein one of the two processors provides position information determined from the received sensor data to the other processor.

15. The system of claim 1, wherein the processing component includes two processors, and either each processor receives the sensor data from each sensor or one of the two processors provides position information determined from the received sensor data to the other processor.

16. The system of claim 1, wherein the processing component compares position information determined from sensor data from all of the sensors to determine a trusted position.

17. The system of claim 1, in a dual-clutch shift rail transmission, wherein the processing component determines the position of two shift rails to monitor the engagement of one gear concurrent with the disengagement of another during an upshift or downshift of the transmission.

18. A method, comprising:
providing a first common electrical reference to a first set of position sensors, each position sensor attached to a shift rail of a transmission;
providing a second common electrical reference to a second set of position sensors, each position sensor attached to a shift rail of a transmission;
receiving sensor data from each position sensor in the first set and in the second set;
determining, in a computing device, from data from each sensor whether the shift rail associated with that sensor is in a position of engagement of a first gear, a position of engagement of a second gear, or in a neutral position;
determining that the data from the first set of position sensors is unreliable; and
operating the transmission using only the gears related to the position sensors in the second set.

19. A system, comprising:
a number N of position sensors, each sensor associated with one of N shift rails in a shift rail transmission system, wherein each sensor is electrically coupled to a control module that provides an electrical reference to the sensor and receives data in the form of an electrical signal from the sensor; and wherein the set of N sensors is divided into subsets and each subset is provided a common electrical reference from the control module; and
a processing component that determines from data from each sensor whether the shift rail associated with that sensor is in a position of engagement of a first gear, a position of engagement of a second gear, or in a neutral position,
wherein the processing component determines, in a dual-clutch shift rail transmission, the position of two shift rails to monitor the engagement of one gear concurrent with the disengagement of another during an upshift or downshift of the transmission.

* * * * *